(12) United States Patent
Hattori

(10) Patent No.: US 9,236,787 B2
(45) Date of Patent: Jan. 12, 2016

(54) MOTIVE POWER TRANSMISSION DEVICE

(75) Inventor: Hiroyuki Hattori, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 262 days.

(21) Appl. No.: 14/111,320

(22) PCT Filed: Apr. 15, 2011

(86) PCT No.: PCT/JP2011/059353
§ 371 (c)(1),
(2), (4) Date: Oct. 11, 2013

(87) PCT Pub. No.: WO2012/140771
PCT Pub. Date: Oct. 18, 2012

(65) Prior Publication Data
US 2014/0035415 A1    Feb. 6, 2014

(51) Int. Cl.
| | | |
|---|---|---|
| *H02K 47/00* | (2006.01) | |
| *H02K 51/00* | (2006.01) | |
| *B60K 6/405* | (2007.10) | |
| *H02K 1/18* | (2006.01) | |
| *H02K 5/04* | (2006.01) | |
| *H02K 16/00* | (2006.01) | |
| *F16H 57/02* | (2012.01) | |
| *B60K 6/26* | (2007.10) | |
| *H02K 7/108* | (2006.01) | |
| *H02K 7/116* | (2006.01) | |

(52) U.S. Cl.
CPC ............... *H02K 51/00* (2013.01); *B60K 6/405* (2013.01); *H02K 1/185* (2013.01); *H02K 5/04* (2013.01); *H02K 16/00* (2013.01); *B60K 2006/266* (2013.01); *F16H 2057/02034* (2013.01); *H02K 7/108* (2013.01); *H02K 7/116* (2013.01)

(58) Field of Classification Search
CPC .. B60K 2006/266; B60K 6/405; H02K 16/00; H02K 5/04; H02K 51/00
USPC ............... 310/89, 113, 216.127, 216.129, 310/216.137, 112; 475/5
See application file for complete search history.

(56) References Cited

U.S. PATENT DOCUMENTS

| | | | | |
|---|---|---|---|---|
| 5,677,582 A | * | 10/1997 | Lutz .................. | B60K 1/02 |
| | | | | 310/113 |
| 7,586,225 B2 | * | 9/2009 | Raszkowski .......... | H02K 5/225 |
| | | | | 180/65.21 |

(Continued)

FOREIGN PATENT DOCUMENTS

| CN | 101111984 A | 1/2008 |
|---|---|---|
| JP | 2007-015441 A | 1/2007 |

(Continued)

*Primary Examiner* — Thanh Lam
(74) *Attorney, Agent, or Firm* — Kenyon & Kenyon LLP

(57) ABSTRACT

A motive power transmission device capable of suppressing deformation of matching surfaces of cases is provided. A motive power transmission device is used as a transmission for a hybrid vehicle containing a first rotating electric machine and a second rotating electric machine as two rotating electric machines. The first rotating electric machine and the second rotating electric machine each serving as a motor/generator are housed in independent first case and second case, and the both are coupled to constitute the transmission for a hybrid vehicle. A first stator and a second stator are fastened and fixed to the first case and the second case on sides opposite to a first matching surface and a second matching surface.

3 Claims, 2 Drawing Sheets

(56) References Cited

U.S. PATENT DOCUMENTS

| | | | |
|---|---|---|---|
| 8,097,997 B2* | 1/2012 | Mizuno | B60K 6/365 310/216.128 |
| 2005/0037883 A1* | 2/2005 | Motoike | B60K 6/365 475/5 |
| 2005/0206248 A1* | 9/2005 | Raszkowski | B60K 6/26 310/54 |
| 2006/0022539 A1* | 2/2006 | Burgman | B60K 6/26 310/112 |
| 2007/0007059 A1 | 1/2007 | Nomura et al. | |
| 2008/0106163 A1 | 5/2008 | Mizuno et al. | |
| 2008/0261740 A1 | 10/2008 | Shimizu | |
| 2009/0200094 A1 | 8/2009 | Zohrer et al. | |

FOREIGN PATENT DOCUMENTS

| | | |
|---|---|---|
| JP | 2008-515726 A | 5/2008 |
| JP | 2008-265517 A | 11/2008 |
| JP | 2009142031 A | 6/2009 |
| JP | 2009-149114 A | 7/2009 |
| JP | 2010-114951 A | 5/2010 |
| JP | 2010-195338 A | 9/2010 |

* cited by examiner

MOTIVE POWER TRANSMISSION DEVICE

CROSS REFERENCE TO RELATED APPLICATION

This is a national phase application based on the PCT International Patent Application No. PCT/JP2011/059353 filed on Apr. 15, 2011, the entire contents of which are incorporated herein by reference.

TECHNICAL FIELD

The present invention relates to a motive power transmission device, and more particularly to a motive power transmission device including two rotating electric machines.

BACKGROUND ART

Conventionally, motive power transmission devices have been disclosed for example in Japanese Patent Laying-Open No. 2009-149114 (PTL 1) and Japanese Patent Laying-Open No. 2008-265517 (PTL 2).

CITATION LIST

Patent Literature

PTL 1: Japanese Patent Laying-Open No. 2009-149114
PTL 2: Japanese Patent Laying-Open No. 2008-265517

SUMMARY OF INVENTION

Technical Problem

PTL 1 discloses a transmission containing two rotating electric machines, in which at least one rotating electric machine has a stator fixed to one of housing cases for housing the respective rotating electric machine, on a side having matching surfaces of the cases. PTL 2 discloses a motive power transmission device in which two rotating electric machines are housed in one case.

Conventional motive power transmission devices have a problem that, since input of vibrations of a stator significantly acts on matching surfaces of housing cases, the matching surfaces of the cases have a reduced rigidity, which leads to deformation of the matching surfaces and increased occurrence of a sealing failure.

Thus, the present invention has been made to solve the aforementioned problem, and one object of the present invention is to provide a motive power transmission device capable of suppressing deformation of matching surfaces of two cases.

Solution to Problem

A motive power transmission device in accordance with the present invention includes a first rotating electric machine axially extending from a first end surface to a second end surface, a first case housing the first rotating electric machine, a first fixing member fixing the first rotating electric machine to the first case on a side having the second end surface, a second rotating electric machine axially extending from a third end surface to a fourth end surface, a second case housing the second rotating electric machine, and a second fixing member fixing the second rotating electric machine to the second case on a side having the fourth end surface, a surface of the first case on a side having the first end surface being bonded to a surface of the second case on a side having the second end surface.

In the motive power transmission device configured as described above, since the first and second rotating electric machines are fixed to the first and second cases on sides opposite to matching surfaces of the first case and the second case, input of vibrations of the rotating electric machines can be reduced in the matching surfaces. As a result, deformation in the matching surfaces of the two cases can be suppressed.

Preferably, the motive power transmission device further includes a motive power split mechanism connected to the first rotating electric machine and the second rotating electric machine.

Preferably, the motive power transmission device further includes a third fixing member bonding the first and second cases.

Preferably, the motive power transmission device further includes a first pedestal interposed between the first rotating electric machine and the first case, and a second pedestal interposed between the second rotating electric machine and the second case.

DESCRIPTION OF EMBODIMENTS

Figure 1:
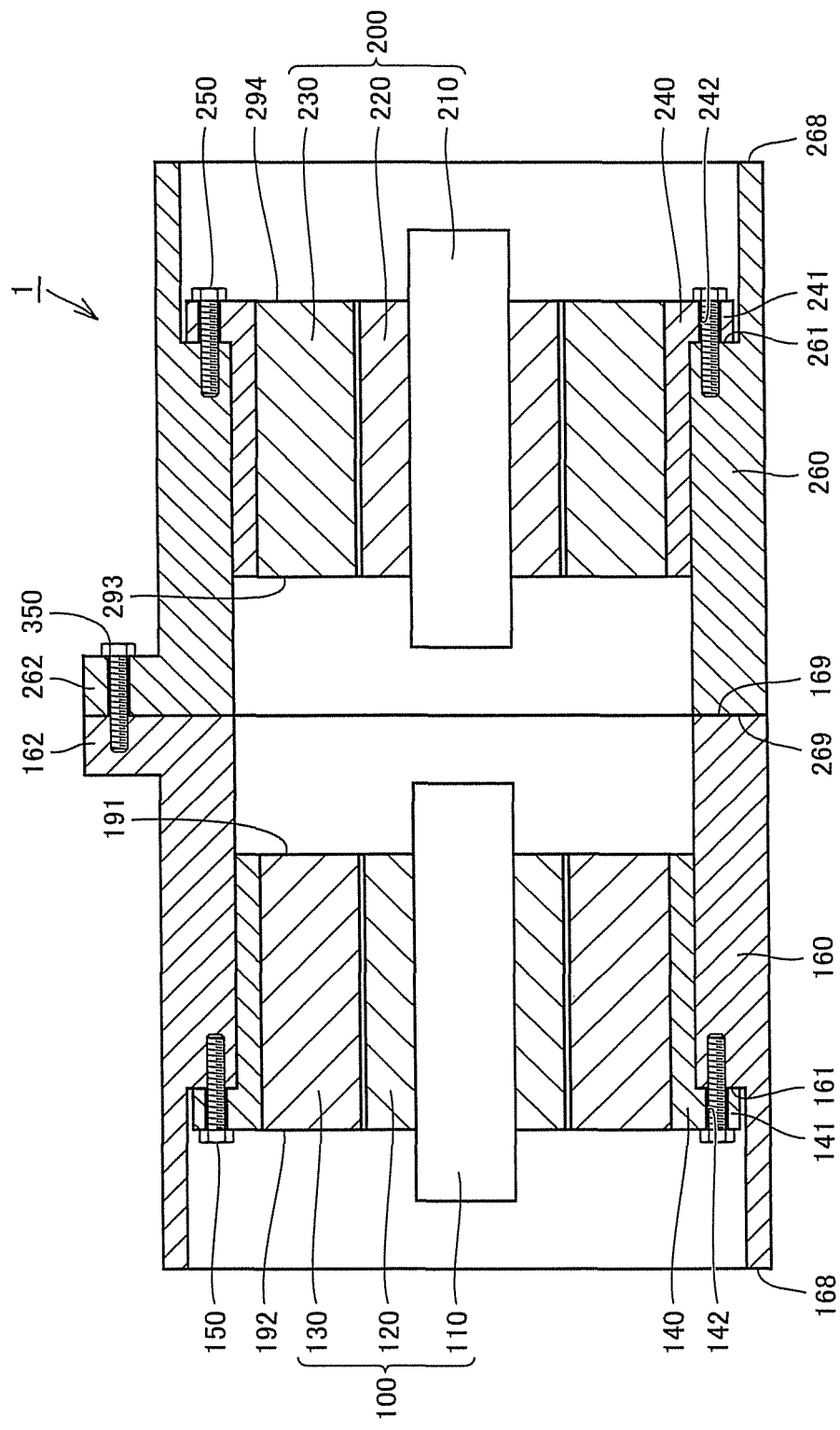
FIG. 1 is a cross sectional view of first and second rotating electric machines as a motive power transmission device in accordance with Embodiment 1 of the present invention.

Hereinafter, embodiments of the present invention will be described with reference to the drawings. In the embodiments below, identical or corresponding parts will be designated by the same reference numerals, and the description thereof will not be repeated. It is also possible to combine the embodiments.

Embodiment 1

FIG. 1 is a cross sectional view of first and second rotating electric machines as a motive power transmission device in accordance with Embodiment 1 of the present invention. Referring to FIG. 1, a motive power transmission device 1 includes a first rotating electric machine 100 axially extending from a first end surface 191 to a second end surface 192, a first case 160 housing first rotating electric machine 100, a first fixing member 150 fixing first rotating electric machine 100 to first case 160 on a side having second end surface 192, a second rotating electric machine 200 axially extending from a third end surface 293 to a fourth end surface 294, a second case 260 housing second rotating electric machine 200, and a second fixing member 250 fixing second rotating electric machine 200 to second case 260 on a side having fourth end surface 294, a first matching surface 169 of first case 160 on a side having first end surface 191 being bonded to a second matching surface 269 of second case 260 on a side having third end surface 293. Motive power transmission device 1 further includes a third fixing member 350 bonding a flange portion 162 of first case 160 and a flange portion 262 of second case 260. A first pedestal 140 is interposed between first rotating electric machine 100 and first case 160, and a second pedestal 240 is interposed between second rotating electric machine 200 and second case 260.

First case 160 and second case 260 are tubular, and first and second rotating electric machines 100, 200 are housed in internal spaces thereof. Stepped portions 161, 261 are formed in first and second cases 160, 260, and first and second pedestals 140, 240 abut on stepped portions 161, 261. In this example, first and second cases 160, 260 each include a large-diameter portion with a relatively large inner diameter and a small-diameter portion with a relatively small inner diameter, and flange portions 141, 241 of first and second pedestals 140, 240 are each located in the large-diameter portion, and portions other than flange portions 141, 241 are each located in the small-diameter portion. The large-diameter portion has a substantially constant inner diameter, and the small-diameter portion also has a substantially constant inner diameter. However, the structure of first and second cases 160, 260 is not limited thereto, and an inner peripheral surface as a tapered surface with a gradually decreasing or increasing inner diameter may be provided. First and second cases 160, 260 extend from end surfaces 168, 268 to first and second matching surfaces 169, 269.

Further, although this example shows a cylindrical inner peripheral surface, the inner peripheral surface is not limited to be cylindrical, and may have a shape of a tubular prism. Further, a portion of the cylindrical inner peripheral surface is provided with a rib, and the rib may axially extend.

First and second fixing members 150, 250 formed of bolts are inserted into through holes 142, 242 in first and second pedestals 140, 240 and screwed into first and second cases 160, 260. Thereby, first and second pedestals 140, 240 can be fixed to first and second cases 160, 260.

As for each of first and second fixing members 150, 250 arranged on a circumference, it is only necessary to provide at least three or more members. First and second rotating electric machines 100, 200 have rotatable first and second rotating shafts 110, 210, first and second rotors 120, 220 provided around outer peripheries of first and second rotating shafts 110, 210, and first and second stators 130, 230 arranged to face first and second rotors 120, 220.

When first and second rotating shafts 110, 210 rotate, first and second rotors 120, 220 attached to the outer peripheries of first and second rotating shafts 110, 210 also rotate. First and second rotors 120, 220 face first and second stators 130, 230. In each of first and second stators 130, 230, a coil is wound around a stator coil. As a technique for winding the coil, both distributed winding and concentrated winding can be adopted. Further, a copper wire constituting the coil may be a round wire or a flat wire.

Outer peripheral surfaces of first and second stators 130, 230 are held by first and second pedestals 140, 240. Outer peripheral surfaces of first and second cases 160, 260 are provided with flange portions 162, 262.

Motive power transmission device 1 in accordance with the present invention is used as a transmission for a hybrid vehicle containing first rotating electric machine 100 and second rotating electric machine 200 as two rotating electric machines. First rotating electric machine 100 and second rotating electric machine 200 each serving as a motor/generator are housed in independent first case 160 and second case 260, and the both are coupled to constitute the transmission for a hybrid vehicle. First stator 130 and second stator 230 are fastened and fixed to first case 160 and second case 260 on sides opposite to first matching surface 169 and second matching surface 269.

By adopting such a structure, vibrations of first rotating electric machine 100 are transmitted to first case 160 through first fixing members 150. As a result, vibrations in the vicinity of first matching surface 169 can be suppressed. Similarly, vibrations of second rotating electric machine 200 are transmitted to second case 260 through second fixing members 250. As a result, vibrations in the vicinity of second matching surface 269 can be suppressed. Thereby, input of vibrations of the stators to first matching surface 169 and second matching surface 269 is reduced, improving reliability of fastening between the cases. Further, since heat of first stator 130 is transferred from flange portion 141 to first case 160 through stepped portion 161, heat transfer to first matching surface 169 is suppressed. Similarly, heat of second stator 230 is also suppressed from being transferred to second matching surface 269. As a result, heat is transferred to both ends of motive power transmission device 1, and heat transfer to the center can be suppressed. Thereby, cooling capacity is improved.

Embodiment 2

Figure 2:
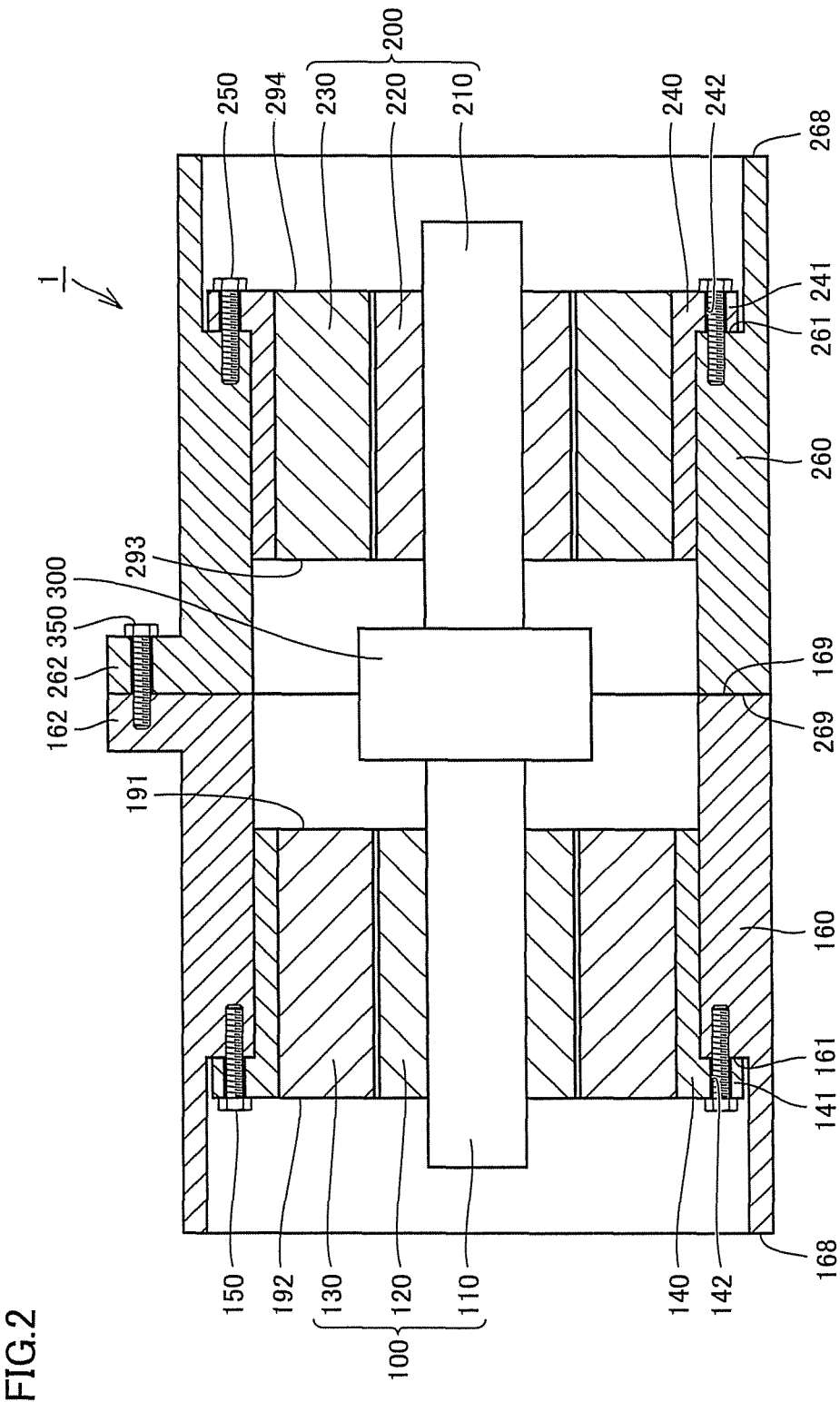
FIG. 2 is a cross sectional view of first and second rotating electric machines as a motive power transmission device in accordance with Embodiment 2 of the present invention.

FIG. 2 is a cross sectional view of first and second rotating electric machines as a motive power transmission device in accordance with Embodiment 2 of the present invention. Referring to FIG. 2, motive power transmission device 1 in accordance with Embodiment 2 of the present invention is different from the motive power transmission device in accordance with Embodiment 1 in that a motive power split mechanism 300 is provided between first rotating shaft 110 and second rotating shaft 210. Motive power split mechanism 300 is formed of, for example, a planetary gear device. Motive power split mechanism 300 is used to split motive power from an engine into motive power for traveling and motive power for generating electric power in a generator. Specifically, one of first rotating shaft 110 and second rotating shaft 210 is connected to the engine. When motive power split mechanism 300 formed of a planetary gear mechanism is driven, noise and vibrations are generated. However, since transmission of these vibrations to first matching surface 169 and second matching surface 269 is reduced as described in Embodiment 1, deformation in first matching surface 169 and second matching surface 269 can be suppressed.

Further, stress on motive power split mechanism 300 is suppressed, and noise and vibrations can be reduced.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: motive power transmission device, 100: first rotating electric machine, 110: first rotating shaft, 120: first rotor, 130: first stator, 140: first pedestal, 141, 162, 262: flange portion, 142: through hole, 150: first fixing member, 160: first case, 161: stepped portion, 169: first matching surface, 191: first end surface, 192: second end surface, 200: second rotating electric machine, 210: second rotating shaft, 230: second stator, 240: second pedestal, 250: second fixing member, 260: second case, 269: second matching surface, 293: third end surface, 294: fourth end surface, 300: motive power split mechanism, 350: third fixing member.

The invention claimed is:
1. A motive power transmission device, comprising:
a first rotating electric machine axially extending from a first end surface to a second end surface;
a first case housing said first rotating electric machine;

a first bolt fixing said first rotating electric machine to said first case on a side having said second end surface;

a second rotating electric machine axially extending from a third end surface to a fourth end surface;

a second case housing said second rotating electric machine; and a second bolt fixing said second rotating electric machine to said second case on a side having said fourth end surface, a surface of said first case on a side having said first end surface being bonded to a surface of said second case on a side having said third end surface;

a first pedestal interposed between said first rotating electric machine and said first case, and a second pedestal interposed between said second rotating electric machine and said second case;

said first bolt screwed into said first case from the side having said second end surface to fix said first pedestal to said first case; and said second bolt screwed into said second case from the side having said fourth end surface to fix said second pedestal to said second case.

2. The motive power transmission device according to claim 1, further comprising a motive power split mechanism connected to said first rotating electric machine and said second rotating electric machine.

3. The motive power transmission device according to claim 1, further comprising a fixing member bonding said first and second cases.

* * * * *